United States Patent [19]
Wiese

[11] 3,970,320
[45] July 20, 1976

[54] MECHANICAL SEAL WITH THERMO-COOLING

[75] Inventor: Winfred J. Wiese, Whittier, Calif.

[73] Assignee: Borg-Warner Corporation, Chicago, Ill.

[22] Filed: Apr. 28, 1975

[21] Appl. No.: 572,377

[52] U.S. Cl. .............................. 277/74; 277/81 R
[51] Int. Cl.² ........................................ F16J 15/34
[58] Field of Search .................. 277/74, 75, 22, 81, 277/15, 27

[56] References Cited
UNITED STATES PATENTS

| | | | |
|---|---|---|---|
| 2,247,505 | 7/1941 | Kohler | 277/74 |
| 2,469,588 | 5/1949 | Aschauer | 277/74 |
| 2,930,636 | 3/1960 | Tracy | 277/74 |
| 3,068,014 | 12/1962 | Wilkinson | 277/74 |
| 3,081,098 | 3/1963 | Stephens | 277/74 |
| 3,526,408 | 9/1970 | Tracy | 277/74 |
| 3,813,103 | 5/1974 | Wiese | 277/27 |

*Primary Examiner*—Robert I. Smith
*Attorney, Agent, or Firm*—Aubrey L. Burgess

[57] ABSTRACT

A mechanical seal assembly having a rotary sealing ring and a nonrotatable sealing ring carried by a housing flange including means to provide improved fluid cooling of the face of the nonrotatable sealing ring and a self-compensating sealing face that increases the fluid leak rate through the seal as a function of heat at the sealing faces.

4 Claims, 6 Drawing Figures

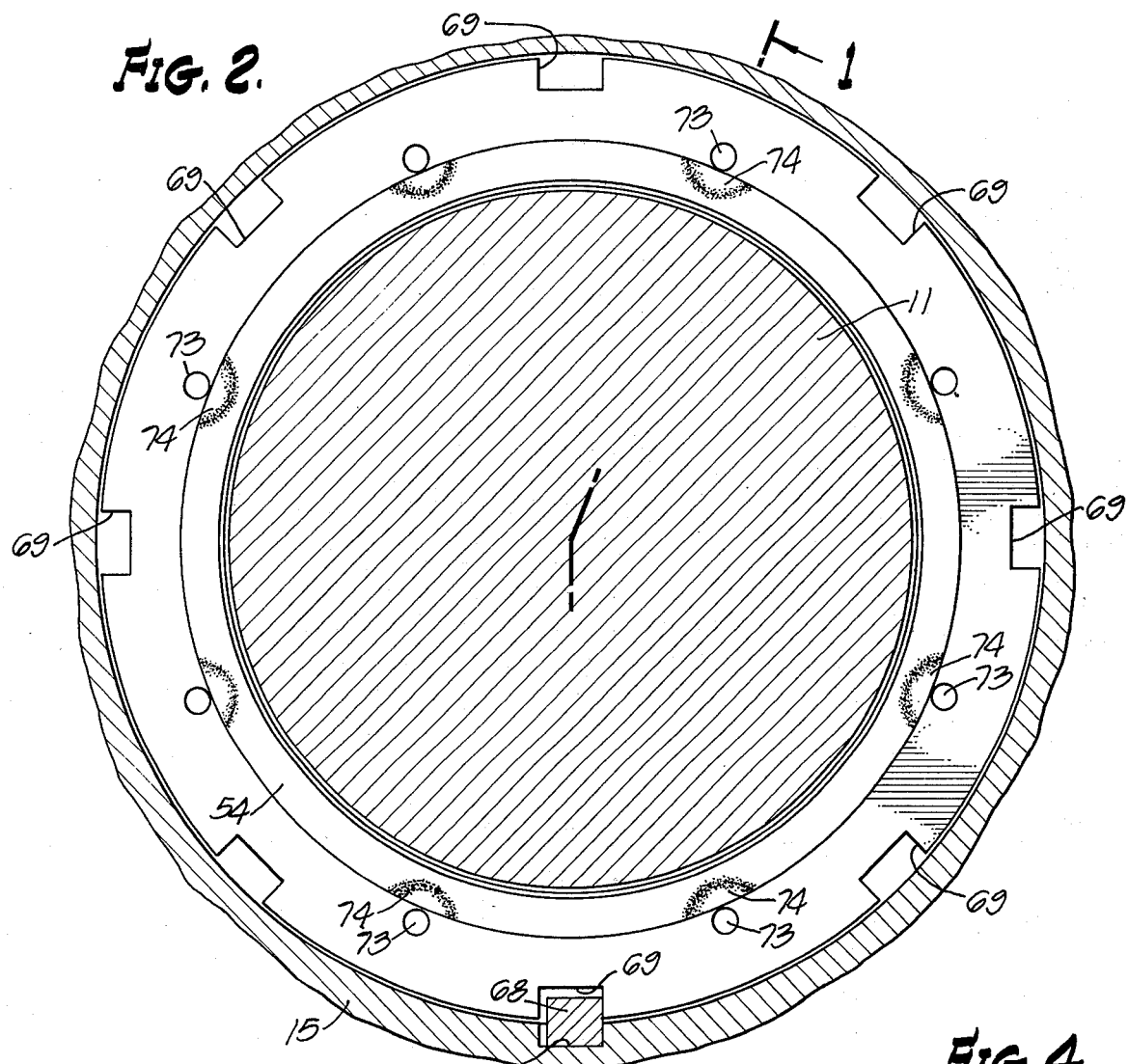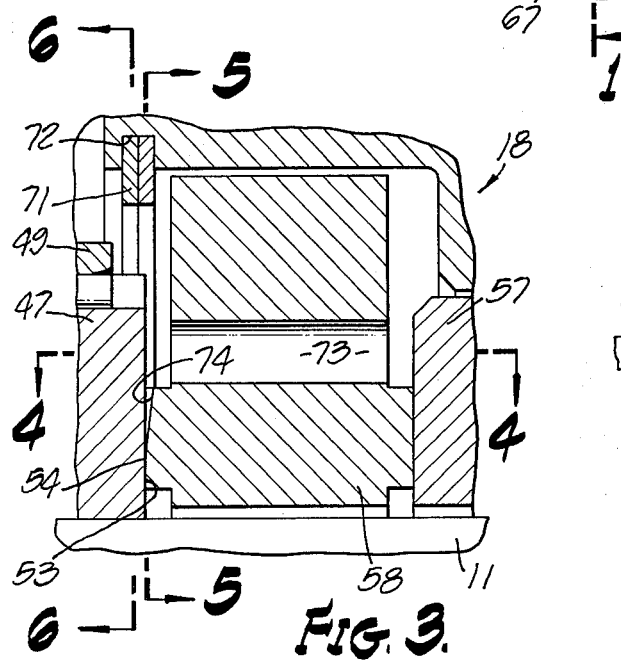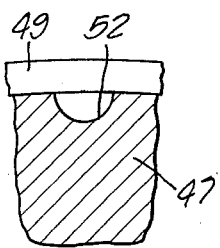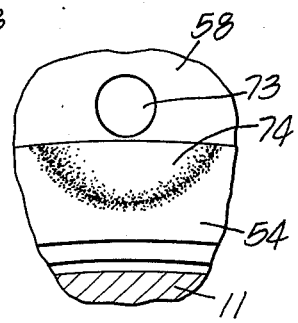

MECHANICAL SEAL WITH THERMO-COOLING

BACKGROUND OF THE INVENTION

1. Field of the Invention

This invention relates to mechanical seals constructed to provide cooling for the face of the nonrotatable sealing ring as a function of the heat at the face.

2. Description of the Prior Art

In my prior patent, U.S. Pat. No. 3,628,799, there is disclosed a mechanical seal having relatively rotatable sealing rings with a passageway through the nonrotatable ring to permit leakage of fluid to the sealing faces which serves to lubricate the faces and to keep them running cool. Because of the construction of the seal, the quantity of fluid flowing to the sealing faces is relatively small and can only offer a minor amount of cooling.

U.S. Pat. No. 3,147,013, issued to Herbert E. Tracy, relates to a dry gas seal assembly in which means are provided to distort or warp at least one of the sealing faces of the sealing elements, so as to trap small portions of the gas being pumped between the faces and thus provide a cushion or a gap between the two faces to reduce wear and prevent seizure of the faces.

THE INVENTION

The present invention resides in a mechanical seal assembly for sealing a rotary shaft to a housing having a shaft opening through which the shaft extends, the mechanical seal assembly including: rotatable sealing ring means mounted on the shaft for rotation therewith, the rotatable sealing ring means having limited movability axially of the shaft; nonrotatable sealing ring means; the rotatable and nonrotatable sealing ring means having opposed, generally radial sealing surfaces disposed in relatively rotatable sealing relationship; and means to provide fluid cooling for the face of the rotatable sealing ring and a self-compensating sealing face that increases the fluid leak rate through the seal as a function of heat at the sealing faces. This is accomplished by taking advantage of the velocity head of the fluid produced at the periphery of the seal parts which is changed to a static head behind the sealing face.

In the construction of the mechanical seal according to this invention, communication is established between the housing opening and a cavity behind the nonrotatable seal ring by openings or slots located at the periphery of the nonrotatable seal ring. A plurality of drilled passages are provided through the nonrotatable seal ring, which passages are closely adjacent the sealing faces between the relatively rotatable sealing rings.

Some or all of the openings or slots at the periphery of the nonrotating sealing ring are keyway slots, receiving keys which key the ring to the housing. Because the velocity head of the fluid in the assemblies is higher at the periphery of the sealing ring than inwardly thereof, the fluid flows to the cavity behind the nonrotating sealing ring and then through the passages, located at a lower fluid velocity head, to a location closely adjacent to the sealing faces, providing a cooling effect on the faces.

When the seal is operating, and fluid is flowing through the passages, the flat sealing surface may become warped in the immediate vicinity of the passages The warpage of the seal faces manifest itself in the formation of minute depressions in the face of the nonrotating sealing ring which extend below the surface of the sealing face, which depressions communicate with the passages through the sealing ring. Cooling fluid is trapped in these minute depressions and contributes to the cooling of the seal faces.

In addition to the cooling benefit, additional benefits are realized from this construction. The passages through the nonrotating sealing ring reduce pressure build-up behind the ring which, if permitted, could unseat the ring from its back-up ring causing the joint to leak.

The flow through the passages and into the depressions cools the immediate area adjacent to the passages. The warpage of the contact surface in the area of the passage is proportional to the heat generated at the seal faces. The amount of heat generated at the seal faces is proportional to the leak rate through the seal. If the leak rate is low, the amount of heat generated at the faces is high; if the leak rate is high, the heat generated is low.

Therefore, the warpage of the contact surface will increase the leak rate through the seal decreasing the amount of heat being generated at the seal faces. Thus the cooling of the seal faces is a function of the heat generated at the seal faces.

THE DRAWINGS

FIG. 2 is a sectional view taken on line 2—2 of FIG. 1 looking in the direction of the arrows;

Figure 1:
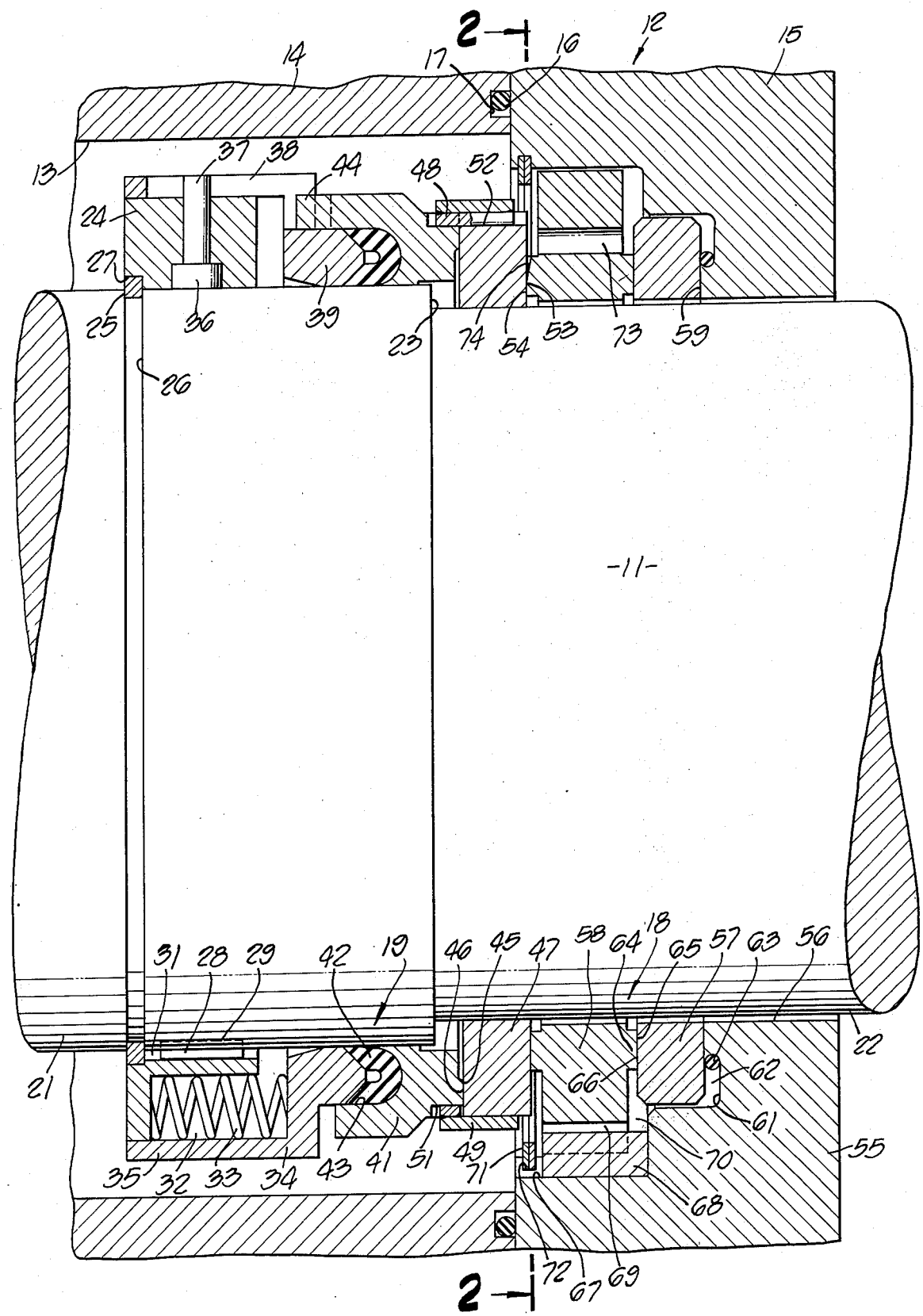
FIG. 1 is an axial sectional view of a mechanical seal assembly embodying the invention and taken on line 1—1 of FIG. 2 looking in the direction of the arrows.

FIG. 3 is an enlarged partial sectional view of the nonrotating sealing ring; and FIGS. 4, 5 and 6 are sectional views taken on lines 4—4, 5—5 and 6—6, respectively of FIG. 5 looking in the direction of the arrows.

DETAILED DESCRIPTION

Referring to the drawings, wherein like reference numerals designate corresponding parts in several views, the mechanical seal assembly shown therein functions to seal a shaft 11 to a housing 12, the shaft being mounted for rotation on bearings (not shown) and extending through a shaft opening 13 in the housing. The housing 12 has two housing portions 14 and 15, the housing portions being secured together by suitable means, such as bolts (not shown). The housing portions 14 and 15 are sealed against leakage through the joint therebetween by an O-ring gasket 16 received in a slot 17 provided in the housing portion 14.

A stationary sealing ring subassembly, designated by the general reference numeral 18, is mounted on the housing portion 15, and a cooperating rotary sealing ring subassembly, designated by the reference character 19, is mounted on the shaft 11 and in opposed sealing relationship with the stationary sealing ring subassembly.

As shown in FIG. 1, the shaft 11 has a shaft section 21 that is of somewhat greater diameter than the shaft section 22, the shaft having a shoulder or step 23 between the foregoing shaft sections. Mounted on the larger shaft section 21 is a spring holder 24, the spring holder being in the form of an annular member that encircles the shaft. A split retaining ring 25 is carried in a groove 26 in the shaft 11 and is received in opposed groove 27 formed in the spring holder 24. It is apparent that the retaining ring 25 holds the spring holder against movement to the left along the shaft, as seen in FIG. 1. The spring holder is driven or rotated by the shaft through a key 28 fitted into a keyway 29 in the shaft and into a corresponding slot 31 in the spring holder. The spring holder is provided with longitudinally extending spring pockets 32, only one of which appears in the drawings, the spring pockets being located circumferentially of the spring holder. Helical springs 33 are compressed into the spring pockets and bear upon a U-cup follower 34 to urge it to the right, as seen in FIG. 1. The U-cup follower is an annular member having a skirt 35 that slides longitudinally on the outer periphery of the spring holder 24. A drive pin 36 extends radially through the spring holder and has its outer end 37 projecting into a longitudinal slot 38 in the U-cup follower, whereby the U-cup follower is caused to rotate with the spring holder, yet is free to slide longitudinally of the spring holder. The U-cup follower has an annular nose 39, the inner circumference of which slides along the shaft.

Slidably mounted on the shaft section 21 is a rotary sealing ring 41, there being a U-cup gasket 42 interposed between the nose 39 of the U-cup follower and a rearwardly facing surface 43 of the rotary sealing ring. Thus, fluid is prevented by the gasket from leaking through the clearance between the shaft section 21 and the rotary sealing ring 41.

At the rear of the rotary sealing ring 41 is an integral tang 44 that projects into the longitudinal slot 38 of the U-cup follower 34 through which means the rotary sealing ring is driven by the U-cup follower; yet the rotary sealing ring may slide, within the limits, longitudinally of the shaft.

The rotary sealing ring 41 has a radially extending annular surface 45 disposed in sealing relationship with a corresponding face 46 on a rotatable sealing ring 47.

The sealing rings 41 and 47 are connected by a suitable number of circumferentially spaced keys 48, which are held in place by an external band 49 and engage key slots 51 and 52 in the outer periphery of the sealing rings 41 and 47, respectively. The sealing ring 47 has a radially extending annular sealing surface 53 in sealing relationship with a corresponding sealing face 54 on the stationary sealing ring subassembly 18. The seal faces 53 and 54 are lapped to optical flatness throughout their sealing surfaces.

The stationary sealing ring subassembly 18 is mounted upon and carried by a support flange 55 that is integral with the housing portion 15 and that projects generally radially inwardly toward the shaft section 22. The flange is annular; and its inner periphery 56 is spaced slightly from the shaft section 22.

The stationary sealing ring subassembly 18, is, in the exemplary embodiment shown in the drawings, a composite structure comprising a backup ring 57 and a stationary sealing ring 58 having the previously mentioned sealing surface 54. The backup ring 57 is disposed in a recess 59 provided in the flange 55, this recess being further extended to form with the backup ring 57, an annular chamber or cavity 62. An O-ring gasket 63 within the cavity 62 seals against leakage of fluid from the cavity 62 radially inward through the joint between the backup ring and the flange.

The stationary sealing ring 58 is disposed between the backup ring 57 and the rotating sealing ring 47 and has an annular projection 64 that abuts the backup ring 57, there being a lapped, fluidtight joint therebetween, formed by a sealing surface 65 on the projection 64 and a complementary sealing surface 66 on the backup ring.

A keyway 67 is provided in the housing portion 15, the keyway facing the outer periphery of the stationary sealing ring. A key 68 is secured in the keyway, as by welding. The key projects into one of a plurality of longitudinal slots 69 in the outer periphery of the stationary sealing ring. It will be obvious that rotation of the stationary sealing ring in the housing portion 15 is thereby prevented. As viewed in the drawings, a cavity 70 is provided behind the stationary sealing ring 58, defined in part by the housing portion 15; the cavity 70 being in fluid communication with the cavity 62.

A spiral snap ring 71 is received in a groove 72 in the housing portion 15, the radially inner part of the snap ring serving to retain the stationary sealing ring 58 in the housing portion 15 when the mechanical seal assembly is taken apart. Upon removal of the snap ring from its groove, the stationary sealing ring can be withdrawn from the housing portion.

In addition to the slots 69, one of which receives the key 68, the stationary sealing ring 58 has a plurality of radially spaced axial fluid passages 73 which open at a location radially spaced from the sealing faces 54 and 65 of the stationary sealing ring 58. Because of localized warpage of sealing face 54, depressions 74 occur adjacent to and radially inward of the passages 73 and in the sealing face 54. These depressions are minute, ranging from a fraction of a millionth of an inch to about one millionth of an inch. The drawings are grossly exaggerated, insofar as these depressions are concerned, for purposes of illustration.

The slots 69 and the passages 73 provide fluid communication between the opening 13 in the housing portion 14 and the cavities 70 and 62 in the housing portion 15.

The rings 41, 47, 58 and 57 may be made of conventional materials; by way of example, the rotary sealing rings 41, 47 and the backup ring 57 are of stainless steel, the stationary sealing ring 58 is of carbon, and the rotary seal ring 47 is of Stellite or other hard alloy.

The operation of the mechanical seal assembly shown in the drawings and thus far described, will now be explained. A liquid, such as water, is within the housing portion 14 and also in the cavities 70 and 62 of the housing portion 15. As the shaft 11 rotates, the rotary sealing ring assembly 19 is turned relative to the stationary sealing ring 58. Because the velocity head of the fluid is higher at the periphery of the sealing rings, a flow of fluid is established through the slots 69 into the cavities 70 and 62 behind the stationary sealing ring 58 and then through the passages 73 located at a lower velocity head, toward the rotary sealing ring 47. Some of the fluid is directed to the seal faces 53 and 54 by the depressions 74 in the seal face 54. A small amount of the fluid will flow through the sealing interfaces 53 and 54 and thence along the shaft 11 and into the cavity at the right of the assembly. Such leakage is normal and desired, as it serves to lubricate the sealing faces 53, 54 and assists in keeping them cool. However, the majority of cooling of the faces 53, 54 is due to the flow of fluid through the passages 73. Additional cooling is provided by fluid flowing into depressions 74 which are formed in the seal face 54 when warpage occurs.

The flow through the passages 73 cools the immediate area adjacent to the passages 73, and because the passages are adjacent to the contact surface 54, the cooling effect will cause a warpage of the surface 54 in the area adjacent to the passages. Such warpage will manifest itself in the formation of and the depressions 74 which enhance the cooling the immediate area of the sealing faces 53, 54 adjacent thereto. Because the passages 73 are adjacent to the sealing faces 53, 54, the warpage of the seal face 54 is proportional to the heat generated at the sealing faces; if the leak rate is low, the amount of heat generated at the faces is high; if the leak rate is high, the heat generated is low.

Therefore, warpage of the sealing face will increase the leak rate through the seal, decreasing the amount of heat being generated at the seal faces, resulting in a self-compensating seal assembly.

I claim:

1. In a mechanical seal assembly for sealing a rotary shaft to a housing having a shaft opening through which the shaft extends, which mechanical seal comprises a rotatable sealing ring means mounted on the shaft for rotation therewith, said rotatable sealing ring means having limited movability axially of the shaft; nonrotatable or stationary sealing ring means; said rotatable and stationary sealing ring means having opposed, generally radial sealing surfaces disposed in relatively rotatable sealing relationship; said housing having a support flange surrounding the shaft which flange supports the stationary sealing ring means on its side opposite to its said generally radial sealing surface and along an annular surface spaced radially inward from its outer periphery; said flange and said stationary sealing ring means defining therebetween an annular cavity disposed radially outward from said annular surface; said stationary sealing ring means having a peripheral portion with a first generally radial annular surface contiguous to said cavity and exposed to pressure of fluid in said cavity, and a second generally radial surface on the opposite side of said peripheral portion exposed to the pressure of fluid within the housing, the improvement which comprises:

first fluid passage means extending through said stationary sealing ring means at the outer periphery thereof establishing fluid communication between said cavity and said housing and second fluid passage means through said stationary sealing ring means located radially inward in said first fluid passage means and also establishing fluid communication between said cavity and said housing, and second fluid passage means opening at its end adjacent to said rotatable sealing means at a location contiguous to said sealing surfaces whereby upon shaft rotation fluid flows from said housing through said first fluid passage means to said cavity and then through said second fluid passage means from said cavity to said housing, said fluid flowing through said second fluid passage providing cooling of said stationary sealing ring means and said sealing faces.

2. In a mechanical seal assembly as recited in claim 1, wherein said second fluid passage means is closely adjacent to said sealing surfaces and radially outwardly thereof.

3. In a mechanical seal assembly as recited in claim 1 in which said fluid flowing through said second fluid passage causes warpage of one of said sealing faces in proximity to said second fluid passage thus forming depressions in said sealing face which trap fluid and enhance the cooling of said sealing faces.

4. A self-compensating mechanical seal responsive to fluid flow across the interface between contacting sealing surfaces which comprises:

a rotating sealing ring having a radially extending sealing face thereon;

a stationary sealing ring having a radially extending sealing face thereon;

said sealing faces contacting one another;

said sealing rings being located in a fluid, the pressure of which exceeds the pressure radially inwardly of said sealing faces such that said fluid tends to leak across said sealing faces; and passage means through one of said sealing rings to provide a flow of said fluid therethrough to a location closely adjacent to said sealing faces;

said flow of fluid causing warpage of at least one of said sealing faces which may form depressions in said one of said sealing faces, said depressions trapping fluid and enhancing the cooling of said sealing faces, the degree of warping and thus the degree of cooling being dependent upon the leakage rate across said sealing faces.

* * * * *